United States Patent Office 3,468,736
Patented Sept. 23, 1969

3,468,736
BONDING SHAPED STRUCTURES FOR
ARTIFICIAL PLASTICS
Philip S. Porter, Lawford, Manningtree, England, assignor to Bakelite Xylonite Limited, a corporation of Great Britain
No Drawing. Filed Apr. 2, 1965, Ser. No. 445,260
Int. Cl. B32b 23/04, 27/04
U.S. Cl. 156—273                                    14 Claims

ABSTRACT OF THE DISCLOSURE

Plastic sheets and films are effectively bonded by heating a heat softenable material having a higher dielectric loss factor than the plastic sheets or films applied to at least one plastic sheet or film with radio-frequency electromagnetic radiation to soften the applied heat softenable material and joining the plastic sheets or films to effect bonding without deleteriously heating the plastic sheets or films.

---

This invention relates to bonding of artificial plastic structures, especially artificial plastic sheets and films.

The use of orientated polymer films as wrapping materials has been restricted by the difficulty of obtaining a satisfactory bond between such films. Conventional heat-bonding methods, when applied to orientated films, cause embrittlement of the film at and near the bonded portion, and puckering and shrinkage in the surrounding area. In some orientated films, for example, orientated polystyrene and orientated polypropylene, embrittlement is associated with heating the films above their "disorientation temperature."

Previously proposed ways of preventing puckering and embrittlement have entailed heating the orientated film itself. One such method involves the use of a multipoint heat sealer. This apparatus however, renders the film undesirably permeable to water vapour, since the film is punctured at the bonded portions.

In another method, selected areas of film are subjected to flame treatment before bonding. The orientated areas of the film thus treated are, however, still liable to shrinkage during bonding.

Still another method employed to bond orientated films involves coating the films with a material which has a softening temperature lower than the disorientation temperature of the orientated film. This method is not desirable since it requires a prolonged heating period wherein the coating is heated through the layers of film. When a package is wrapped in the coated, orientated film, it remains in contact with the heat source in the wrapping machine and the film becomes overheated.

It is an object of the present invention to provide a process whereby shaped plastic materials can be bonded to each other or to a substrate without damaging the plastic materials employed.

This and further objects will become more clear when considered in light of the ensuing discussion.

Accordingly, the objects of the present invention are generally accomplished by applying to a shaped structure, a layer of heat-softenable material having a higher dielectric loss factor than that of an artificial plastic material; subjecting the shaped structure and applied layer to radio-frequency electromagnetic radiation to soften the applied layer; contacting the softened layer on the shaped structure with the substrate; and displacing the area of contact from the radio-frequency radiation to cool the layer and bond the shaped structure to the substrate, the dielectric loss factors of the layer and shaped structure being such that when the layer is softened by the heating effect of the radio-frequency field, the shaped structure is not heated to any deleterious extent.

Advantageously, the substrate can also be provided with an applied layer of heat-softenable material.

More particularly, the present invention provides a method of bonding an artificial plastic sheet or film to a second artificial plastic sheet or film (which can be a different, or another part of the same, sheet or film and can be comprised of the same or a different material), which comprises applying to the first-mentioned sheet or film a layer of heat-softenable material having a higher dielectric loss factor than that of the first-mentioned sheet or film; placing the first-mentioned sheet or film and applied layer in a radio-frequency electromagnetic field to soften the applied layer; contacting the softened layer on the first-mentioned sheet or film with the second sheet or film; and displacing the area of contact from the radio-frequency field to cool the layer and bond the first-mentioned sheet or film to the second sheet or film, the dielectric loss factors of the layer and the first-mentioned sheet or film being such that, when the layer is softened by the heating effect of the radio-frequency field, the first-mentioned sheet or film is not heated to any deleterious extent and, where the second-mentioned sheet or film is within the radio-frequency field, its dielectric loss factor is also such that it is not heated to a deleterious extent.

The heat-softenable layer can advantageously be softened in contact with the portion of the second sheet or film to which it is to be bonded.

By practicing the process of the present invention, there can be obtained laminates of artificial plastic sheets or films, hermetically sealed wrappings of artificial plastic sheets or films, articles, for example sacks or bags, sealed or bonded by the method of the present invention, and so forth.

The first-mentioned sheet or film can be comprised of an orientated artificial plastic as, for example, orientated polypropylene or orientated polystyrene. The second sheet or film can also be of an orientated artificial plastic, which may be the same as, or different from, the first such as polyethylene. Hence, either sheet or film, or both sheets or films, can be polyethylene, polystyrene, polypropylene and so forth.

The heat-softenable layer and the first-mentioned sheet or film can also be held in contact by pressure while in the electromagnetic field, or the heat-softenable layer may be applied beforehand as a coating to or as a laminate with the said sheet or film. The laminate can be suitably formed by adhesively contacting the heat-softenable layer to the sheet or film. When the heat-softenable layer is applied as a coating it can, for example, be applied in solution, and the solvent evaporated. Further, the first-mentioned sheet or film can also have a heat-softenable layer applied to each face. This feature is especially advantageous when the sheet or film is to be used as an overwrap. The second sheet or film can also have a heat-softenable layer applied to one or both faces. Preferably, a heat-softenable layer is applied to each face of the sheet or film which is to be bonded.

The relative thicknesses of the heat-softenable layer and the sheet or film are not narrowly critical and can be varied within wide limits.

The heat-softenable layer on the shaped structure, especially the first-mentioned sheet or film, can be contacted with the substrate, which can also be the second sheet or film, while in the electromagnetic field. Where the second sheet or film is of a material having a higher dielectric loss factor than that of the heat-softenable layer, or consists of a material which interacts with, or is deleteriously affected by, a strong radio-frequency field, the softened layer can be contacted with the second sheet or film after the layer has been removed from the field.

Bonding of the softened layer and the second sheet or film generally requires only "contact pressure" between the two sheets or films.

It is within the scope of the present invention to bond a plurality of the same or different artificial plastic sheets or films by the application of a heat-softenable layer to a suitable number of faces. When a sheet or film is used to form an overwrapping for a package, for example, the heat-softenable layer can be applied to both faces of the film, preferably as a coating. Since the point of contact of two heat-softenable layers becomes the center of the heat-generation zone, maximum heating occurs in this area, from which an efficient bond is obtained, irrespective of the number of sheets or films superimposed on those to be bonded. In this way, an effective, hermetically sealed wrapping can be achieved.

The process of the present invention also permits continuous bonding of moving webs or laminates of sheets or films to be achieved. Wrapping of a package or carton can thus be performed in a conventional wrapping machine incorporating a radio-frequency source.

Additionally, the process of the present invention permits the manufacture of a tube from a sheet or film of artificial plastic material by applying to at least the margins of one or both faces thereof a heat-softenable layer; softening the layer, at least at the margins of the face or faces; subjecting the film to a means of radio-frequency radiation; contacting opposite marginal regions of the sheet or film, to at least one of which regions is applied the heat-softenable layer; applying pressure where required, to the contacted regions; and displacing the contacted regions from the radiation to cool the layer and bond opposite margins to form a tube. The margins can be contacted so that the margin of one face is bonded to the margin of the other face, in which form the layer is conveniently applied to both faces. Alternatively, opposite margins can be contacted "face-to-face" or "back-to-back," giving an inwardly or outwardly projecting longitudinal seam.

The process of the present invention can be further applied to manufacture of sacks, bags, pillow packs, twist wraps for confectionery, shrink-film wraps and carton overwraps. Thus, the present invention readily provides a process for wrapping an article, which comprises contacting the article with a sheet or film having applied to at least one margin of one or both of its faces a heat-softenable layer, the dielectric loss factors of the heat-softenable layer and of the sheet or film being such that the heat-softenable layer may be softened by electromagnetic radiation of radio-frequency without the sheet or film being heated to any deleterious extent; folding the sheet or film around the article so as to enclose it; contacting at least a portion of the part of the sheet or film having the layer applied thereto with a further part of the sheet or film; subjecting the sheet or film to radio-frequency electromagnetic radiation to soften the layer while in contact with the further part of the sheet or film; and cooling the layer to bond together the portions of the sheet or film thus contacted.

It should be understood that in the practice of the present invention, the heat-softenable layer can be applied to the whole face of a sheet or film; while in other instances, the heat-softening layer can be selectively applied only to those areas which it is desired to bond.

Among the suitable heat-softenable materials which can be employed in the present invention, is a composition comprising polyisobutylene, terpene resin and Micro-Cel slip agent, which is capable of being dissolved in toluene, the solution being applied to the artificial plastic film as a coating, and the solvent then evaporated; a blend of an ethylene/vinyl acetate copolymer, a phenolic resin and a polyester plasticizer; and a blend of butadiene/methyl methacrylate copolymer, a molecular sieve enclosing water and a wetting agent.

The heat-softenable layer can also consist of a material which has a dielectric loss factor similar to that of the artificial sheet or film, blended with a material which increases the loss factor as, for example, carbon black.

The frequency of the electromagnetic radiation can range between about 30 to 250 mc./s., and preferably between about 30 to 100 mc./s. As employed throughout this application, it should be understood that the symbols mc./s., kw. and w. are intended to mean megacycles per second, kilowatts and watts, respectively.

The shaped structure having a heat-softenable layer applied thereto can be contacted with the substrate and clamped or otherwise held between welding electrodes. Alternatively, for example when the substrate is polystyrene, the region to be bonded can be placed close to, but not between, the two electrodes, so that it lies in a plane generally perpendicular to the faces of the electrodes but not within the space between them.

Regardless of the bonding method employed, the loss factor of the heat-softenable material should be sufficient to cause it to soften rapidly before the temperature of the shaped structure has risen to a level at which it may be damaged. The heat-softenable material can suitably consist of a blend of a "heat-sealable" polymer which has a high loss component as, for example, a butadiene/methyl methacrylate copolymer with water entrapped in a molecular sieve (to prevent evaporation during coating, etc.).

When the region to be bonded is clamped between the electrodes, heat conduction from the materials to the electrodes becomes significant. In some instances, this can be beneficial, since sufficient heat can be conducted away from the plastic material which would otherwise be damaged. On the other hand, if the loss factor of the heat-softenable layer is not greatly different from that of the plastic material, conduction will increase the time taken for the heat-softenable layer to reach softening temperature to an undesirable extent. The method of welding preferably employed, however, and the time to which a zone is to be subjected to heating, can readily be determined for individual materials.

The following examples are set forth as being illustrative of the present invention and are in no way intended to be limitative thereof:

EXAMPLE 1

One face of a biaxially orientated polypropylene film having a thickness of 0.00075" was coated with a 0.0001" layer of heat-softenable material having the following composition, the parts being expressed by weight:

Polyisobutylene _____ 10
Terpene resin _____ 10
Micro-Cel slip agent _____ 1

The layer was applied in a toluene solution containing 5.25% by weight of the above component.

The dielectric loss factor of orientated polypropylene being 0.0008, at 20° C. and 46 mc./s.

The dielectric loss factor of the coating being 0.002, at 20° C. and 46 mc./s.

The coated faces of two samples of the film were contacted and subjected for 0.2 second to electromagnetic radiation having a frequency of 37 mc./s., at 750 kw. at an electrode which measured 2" x 0.125". The bond obtained had a peel strength of 250 gm./in. width, and there was no adverse effect on the strength or appearance of the film at or adjacent to the bonded area.

After aging, the dielectric loss factor of the coating used was found to be 0.0068, at 20° C. and 46 mc./s.

EXAMPLE 2

A biaxially orientated polypropylene film having a thickness of 0.001" was laminated by means of a water-based adhesive to an orientated plasticized polyvinyl chloride film, Vitafilm (a trade name of the Goodyear Co.), having a thickness of 0.00075", and a dielectric loss factor of 0.03 at 20° C. and 46 mc./s. Two samples of this laminate were superimposed with the polyvinyl chloride surfaces in contact and subjected to electromagnetic radiation under the same conditions as set forth in Example 1. A strong bond was obtained between the polyvinyl chloride surfaces without any disorientation of the polypropylene film.

EXAMPLE 3

One face of a biaxially orientated polypropylene film having a thickness of 0.00075″ was coated with a heat-softenable layer of 0.0005″ thickness, of the following composition expressed in parts by weight:

Co-Mer DQDA 7268 _____ 37.5
Phenolic resin R17301 _____ 37.5
Plastolein 9750 _____ 25.0

Co-Mer DQDA 7268 is an ethylene/vinyl acetate copolymer containing 75% ethylene.

Phenolic resin R17301 is a 100% phenolic resin.

Plastolein 9750 is a medium molecular weight polyester polymer plasticizer.

The heat-softenable layer was applied by extruding a bead at 100° C. onto the surface of the film. The coated surface was then contacted with an uncoated surface and subjected for a period of 1 second to an electromagnetic radiation having a frequency of 37 mc./sec. at 750 volts using an electrode measuring 2″ x 0.125″. The bond obtained had a peel strength of greater than 1000 gm. per inch width. There was no adverse effect on the strength and appearance of the film in the area of the seal.

EXAMPLE 4

The heat-softenable composition of Example 3 was used to seal polyethylene film using the same method as in Example 3.

A polyethylene sack measuring 20″ x 2′6″ was prepared using the composition of Example 3. A flattened tube of polyethylene film having a thickness of 0.008″ was die cut forming flaps in each end. The adhesive was then applied in a U pattern by extruding a bead at 150° C. onto the shaped bottom of the bag. The flaps at one end were then infolded in overlapping relationship and the adhesive activated by a high frequency electrode under a pressure of 7 lbs. per inch and having a frequency of 40 mc./sec. at 750 volts. Duration of electrode exposure was 1 second. A sack was obtained having a flat bottom which sack was then filled with 50 lbs. of resin and dropped from a height of 8 ft. several times. In all cases where a breakage occurred it was the polyethylene film which broke and not the sealed area.

The peel strength on the bond obtained by this heat-softenable material and polyethylene film was found to be in excess of 4000 gm. per inch width.

In order to obtain faster sealing speeds of, for example, about ½ sec. electrode exposure time, the electrode can be preheated which, in turn, acts to reduce the heat loss from the adhesive into the electrode.

EXAMPLE 5

One face of a biaxially orientated polystyrene film having a thickness of 0.001″ was coated with a 0.0002″ layer comprising a mixture of the following components:

Cc.
46% butadiene-methyl methacrylate copolymer latex _____ 50
25% sieve suspension in water _____ 50
Wetting agent _____ 0.5

This mixture was applied to the film and dried to give a uniform coating in a stream of air at 80° C.

The coated faces of two samples of film were contacted and clamped under light pressure between a pair of electrodes arranged as opposing jaws with a contact area measuring 2″ x 0.0625″. An electromagnetic radiation having a frequency of 48 mc./s. at 750 w. was applied across the electrodes for 3 seconds producing a bond which was found to have a peel strength of 350–400 gm./in. width. There was no adverse effect on the strength or appearance of the film at or adjacent to the bonded area.

When the coated surfaces of two samples of film were contacted and held against a gap measuring 0.0625 between two parallel electrodes and an electromagnetic radiation having a frequency of 48 mc./s. at 750 w. was applied for 3 seconds, a bond was obtained which exhibited a peel strength of between 200–250 gm./in. width. Again, there was no adverse effect on the strength or appearance of the film at or adjacent to the bonded area.

While the present invention has been set forth in detail and with particularity, it should be understood that it is susceptible to variations, changes and modifications without departing from the scope of the invention as set forth in the appended claims.

What is claimed is:

1. A method of bonding a first artificial plastic film sheet to a second artificial plastic film sheet which comprises, in combination (a) applying to at least a portion of one surface of a first sheet of an oriented plastic film a layer of a heat-softenable material having a higher dielectric loss factor than that of said first plastic film sheet; (b) subjecting said first plastic film sheet having the heat softenable layer applied thereto to radio-frequency electromagnetic radiation which acts to soften said applied layer; (c) contacting said layer while soft with a second plastic film sheet; and (d) displacing the area of contact from the radio-frequency field to cool the layer causing the two plastic film sheets to become bonded together, the dielectric loss factors of said layer and said plastic film sheets being such that when the layer is softened by the heating effect of the radio-frequency field, the plastic film sheets are not heated to any deleterious extent.

2. The method of claim 1, wherein the layer is softened while in contact with the second plastic film sheet.

3. The method of claim 1 wherein the first plastic film sheet is polypropylene.

4. The method of claim 1 wherein the first plastic film sheet is polystyrene.

5. The method of claim 1 wherein the heat-softenable material is a blend consisting essentially of polyisobutylene and a terpene resin.

6. The method of claim 1 wherein the heat-softenable material is a plasticized polyvinyl chloride.

7. The method of claim 1 wherein the heat-softenable material is a blend consisting essentially of a polymer having a dielectric loss factor not substantially greater than that of the first plastic film sheet and a material having a substantially higher dielectric loss factor.

8. The method of claim 7 wherein the heat-softenable material having a high dielectric loss factor contains water entrapped in a molecular sieve.

9. The method of claim 1 wherein the first and second plastic film sheets are different portions of the same plastic film sheet.

10. The method of claim 1 wherein the electromagnetic radiation has a frequency of between about 30 and 250 mc./s.

11. The method of claim 10, wherein the electromagnetic radiation has a frequency of between about 30 and 100 mc./s.

12. A process for wrapping an article, which comprises, in combination; (a) contacting the article with an oriented plastic film sheet having a heat-softenable layer applied thereon; the dielectric loss factors of the heat-softenable layer and of the plastic film sheet being such that the heat-softenable layer can be softened when exposed to electromagnetic radiation of radio-frequency without deleteriously heating the plastic film sheet; (b) folding the plastic film sheet about the article enclosing said article within said plastic film sheet; (c) contacting at least a portion of the plastic film sheet containing said layer with another portion of said plastic film sheet; (d) subjecting the thusly folded and contacted plastic film sheet to radio-frequency electromagnetic radiation which acts to soften said layer in contact with said other portion of said plastic film sheet; and (e) cooling said softened layer to create a bond between the portions of said plastic film sheet thus contacted.

13. The process of claim 12, wherein the other portion of said plastic film sheet also has the heat-softenable layer applied thereto.

14. A process for the manufacture of a tube, formed from a plastic film sheet which comprises in combination; (a) applying to at least one face of a flattened tubular oriented plastic film sheet a heat-softenable layer having a dielectric loss factor such that the layer is capable of being softened when exposed to the heat generated from the electromagnetic radiation of radio-frequency without deleteriously affecting said plastic film sheet; (b) contacting with each other marginal regions of said plastic film sheet such that the heat-softenable layer on one face of said plastic film sheet is in contact with the opposite margin of said plastic film sheet; (c) subjecting the heat-softenable layer to electromagnetic radiation which acts to soften it in its area of contact with said opposite margin; and (d) cooling said contacted margins such that said opposite margins become bonded together to form a tube.

References Cited
UNITED STATES PATENTS

| | | | |
|---|---|---|---|
| 2,719,100 | 9/1955 | Banigan | 156—309 |
| 3,026,225 | 3/1962 | Ostby | 156—309 |
| 2,570,921 | 10/1951 | Collins | 156—380 |
| 2,859,153 | 11/1958 | Zucht | 156—273 |
| 2,992,958 | 7/1961 | Yamaguchi | 156—273 |
| 3,336,173 | 8/1967 | Renfroe | 156—273 |

OTHER REFERENCES

Stanley, F. C.: High Frequency Plastic Sheet Welding, 1961, pp. 133, 134.

DOUGLAS J. DRUMMOND, Primary Examiner

U.S. Cl. X.R.
53—373; 156—309